Dec. 18, 1962 J. K. DAVIS 3,069,294
ELECTRICAL METAL OXIDE RESISTOR HAVING
A GLASS ENAMEL COATING
Filed June 3, 1954
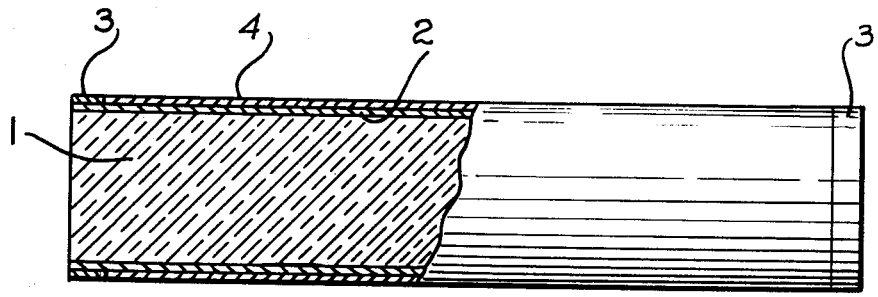
INVENTOR.
JAMES K. DAVIS
BY Clarence R. Patty, Jr.

United States Patent Office 3,069,294
Patented Dec. 18, 1962

3,069,294
ELECTRICAL METAL OXIDE RESISTOR HAVING A GLASS ENAMEL COATING
James K. Davis, Corning, N.Y., assignor to Corning Glass Works, Corning, N.Y., a corporation of New York
Filed June 3, 1954, Ser. No. 434,150
7 Claims. (Cl. 117—212)

This invention relates to electrical resistors of the type comprising a ceramic body, such as a tube, rod or sheet of glass, porcelain, sillimanite, or the like, having on its surface an adherent electroconductive film of metal oxide and spaced metallic terminals in electrical contact with the film.

Such resistors have heretofore been made by heating the ceramic body to an elevated temperature in the neighborhood of 500°–700° C. or higher and contacting it while so heated with the vapor, or an atomized solution, of a hydrolyzable inorganic or organic salt or other compound of a metal or a mixture of such metal salts or compounds, such as the chloride, bromide, iodide, sulfate, nitrate, oxalate, or acetate of tin, indium, or cadmium, or of tin and antimony, tin and indium, or tin and cadmium either with or without a similar hydrolyzable salt or other compound of a modifying metal such as zinc, iron, copper, or chromium. Such procedure results in the formation of a thin, strongly adherent, electroconductive surface film of the metal oxide or oxides.

The thickness of such a film increases with the length of time during which the heated body is contacted with the vaporized metal salt, and its electrical resistance generally decreases as its thickness is increased. Films having thicknesses from less than the 1st order of interference colors up to about the 10th order with electrical resistances of 1,000,000 or more down to 5 or less ohms per unit square can thus be produced. Higher resistances can also be obtained by cutting through a film of a given resistance on a cylindrical ceramic body to shape the film into a spiral strip of predetermined width and length.

While resistors comprising such electroconductive films are useful for many purposes involving little or no change in their temperatures, their electrical, thermal, chemical, and mechanical stabilities are inadequate for satisfactory use under all conditions because of undesirable variations and/or permanent changes in their resistances resulting from such instabilities. Such a variation or change may result from failure of the resistance of the film to return to its initial value after operation under an electrical load, or after a thermal change. The exposure of the film to atmospheric moisture or other gases or vapors or to chemical reagents or to mechanical abrasion also affects its electrical resistance undesirably.

I have now discovered that such difficulties can largely be overcome and the electrical, thermal, chemical and mechanical stabilities of such a resistor can be greatly improved by covering the exposed portion of the metal oxide film between the spaced metallic terminals with a layer of a ceramic glaze or enamel frit having a thermal expansion coefficient compatible with that of the body and fusing the enamel to the film.

By compatible expansion coefficients I mean expansion coefficients which are similar enough in magnitude so that stresses, particularly surface tensional stresses, sufficient to cause breakage of the resistor or mechanical damage to the electroconductive metal oxide film, when the resistor is heated or cooled, will not be developed either in the ceramic body or the enamel coating.

While it might be expected that the fluxes of the enamel during its fusion would dissolve at least the major portion of the metal oxide film with a corresponding increase in its resistance, I have surprisingly found that such dissolution, if it occurs, is too slight to affect seriously the resistance of the film. Even very thin, high-resistance, first-order films, which are ordinarily unsuitable for resistors on account of their extreme instability, can be glazed in accordance with my invention without disrupting or otherwise destroying them and stable high-resistance films can thus be produced.

The improved electrical resistor resulting from such method and forming a part of this invention comprises a ceramic body having on its surface an adherent electroconductive metal oxide film, spaced metallic terminals on the body in electrical contact with the film, and a fused ceramic enamel covering said film and extending between the terminals, the thermal expansion coefficients of the body and the enamel being compatible.

The single FIGURE in the accompanying drawing is illustrative of one embodiment of an electrical resistor made in accordance with this invention and shows partly in section a ceramic body provided with an electroconductive metal oxide film in electrical contact with spaced metallic terminals and a ceramic enamel covering said film between said terminals.

In carrying out the process particularly having reference to the drawing, a ceramic body 1 is first coated with an electroconductive metal oxide film 2 by heating the body, preferably at 500°–700° C. and contacting it with the vapors of the desired salt or salts. While anhydrous solutions of the salts may be utilized, I have found it preferable to use aqueous solutions thereof containing sufficient acid to prevent separation of hydrolysis products. Spaced metallic terminals 3 on the resistor in electrical contact with the electroconductive film and preferably superimposed on it are formed by conventional metallizing, as for example, by applying a silver-containing glaze and firing the resistor to fuse the glaze and unite the silver with the film and/or the ceramic body. Such methods of preparing electroconductive metal oxide films and electrical resistors comprising them are described in detail in Patent No. 2,564,706 issued August 21, 1951, to John M. Mochel.

The coated resistor thereafter has a ceramic enamel 4 applied thereto, according to the invention, by coating the electroconductive film 2 between the terminals 3 with a layer of finely pulverized ceramic enamel frit, preferably by spraying it with a suspension of the frit in water or other suitable medium. After being dried, the coated resistor is fired at a temperature high enough to fuse the frit without deforming the body. Desirably, firing takes place in a neutral or non-oxidizing atmosphere, such as an atmosphere of nitrogen or argon, since it has been found that, when fired in an atmosphere containing oxygen the resistor tends to become polarized and electrically unstable in use, particularly if the electroconductive metal oxide film is of the first order or thinner. Films of the third order or thicker are not as readily affected and may be fired in air without seriously objectionable results.

If either the supporting ceramic body or the ceramic enamel composition, and particularly the latter, contains a substantial amount of alkali metal oxide, say more than about 1%, the electroconductive metal oxide film tends to become electrically unstable under electrical load. Such instability is believed to be due to migration of alkali metal ions into the electroconductive film when the film is heated by the passage of an electric current therethrough. I have found, however, that this difficulty can be overcome and a high electrical stability of the film can be maintained by utilizing a supporting body and an enamel composition, particularly the latter, which contain less than 1%, and preferably are substantially free, of alkali metal oxide.

To produce an electroconductive metal oxide film of maximum electrical stability, the surface of the supporting ceramic body should be relatively smooth and low in porosity.

The thermal expansion coefficients of the body and the superposed ceramic enamel should be compatible with each other. The thermal expansion coefficient of the enamel, however, is advantageously somewhat lower than that of the ceramic body because this results in a desirable slight compressional stress in the surface of the resistor which tends to increase its mechanical and thermal strength.

A supporting body of glass is particularly satisfactory because it is non-porous and its thermal expansion coefficient is easily controllable. Other ceramic bodies of low porosity and sufficiently refractory to withstand heating at 500°–700° C. or higher, such as porcelain and sillimanite, are also suitable.

By way of example only, the following compositions, calculated from their batches in weight percent on the oxide basis illustrate suitable compositions for carrying out the invention:

|  | 1 | 2 | 3 | 4 |
|---|---|---|---|---|
| $SiO_2$ | 59.5 | 62 | 43.9 | 44 |
| $B_2O_3$ | 5 |  | 17 | 17 |
| $Al_2O_3$ | 19 | 15 | 7 | 7 |
| MgO | 9 | 8.3 |  |  |
| CaO | 7 | 14.7 |  |  |
| ZnO |  |  | 5 | 5 |
| PbO |  |  | 26.8 | 27 |
| $Na_2O$ | 0.5 |  |  |  |
| $Li_2O$ |  |  | 0.3 |  |
| Exp. Coeff. × 10⁷ | 42 | 45.5 | 37 | 36 |
| Softening Point, °C | 915 | 946 | 650 | 725 |

Examples 1 and 2 are glasses which are particularly adapted for the support of electroconductive metal oxide films in the production of the present electrical resistors; and Examples 3 and 4 are enamels suitable for covering such films for the improvement of their electrical, thermal, chemical, and mechanical stabilities.

I claim:
1. An electrical resistor comprising a ceramic body containing less than 1% of alkali metal oxides having on its surface an adherent electroconductive film consisting of at least one conducting metal oxide selected from the group consisting of an oxide of tin, an oxide of indium, an oxide of cadmium, oxides of tin and antimony, oxides of tin and indium, and oxides of tin and cadmium, said film being not thicker than the tenth order of interference colors, spaced metallic terminals in electrical contact with the film, and a fired-on ceramic enamel containing less than 1% of alkali metal oxides covering said film and extending between said terminals, the thermal expansion coefficients of the body and the enamel being compatible.

2. The electrical resistor claimed in claim 1 in which the thermal expansion coefficient of the enamel is less than that of the ceramic body.

3. The electrical resistor claimed in claim 1 in which the ceramic body is a glass consisting essentially of 59.5% $SiO_2$, 5% $B_2O_3$, 19% $Al_2O_3$, 9% MgO, 7% CaO, and 0.5% $Na_2O$.

4. The electrical resistor claimed in claim 1 in which the ceramic body is a glass consisting essentially of 62% $SiO_2$, 15% $Al_2O_3$, 8.3% MgO, and 14.7% CaO.

5. The electrical resistor claimed in claim 1 in which the ceramic enamel consists essentially of 43.9% $SiO_2$, 17% $B_2O_3$, 7% $Al_2O_3$, 5% ZnO, 26.9% PbO, and 0.3% $Li_2O$.

6. An electrical resistor comprising a ceramic body containing less than 1% of alkali metal oxides and having on its surface an inherent electroconductive film not thicker than the tenth order of interference colors consisting of at least one conducting metal oxide, spaced metallic terminals in electrical contact with the film, and a fired-on ceramic enamel consisting essentially of 44% $SiO_2$, 17% $B_2O_3$, 7% $Al_2O_3$, 5% ZnO, and 27% PbO covering said film and extending between said terminals, the thermal expansion coefficients of the body and the enamel being compatible.

7. The electric resistor claimed in claim 6 in which the ceramic body is a glass consisting essentially of 62% $SiO_2$, 15% $Al_2O_3$, 8.3% MgO, and 14.7% CaO.

References Cited in the file of this patent
UNITED STATES PATENTS

| 1,938,674 | Terwilliger | Dec. 12, 1933 |
| 2,027,413 | Andres | Jan. 14, 1936 |
| 2,357,473 | Jira | Sept. 5, 1944 |
| 2,582,081 | Sun et al. | Jan. 8, 1952 |